F. DEFRANCESCHINI.
Insect-Traps.

No. 147,226.    Patented Feb. 3, 1874.

WITNESSES.
P. C. Dieterich
Harry C. Scott

INVENTOR
Francesco Defranceschini,
per C. H. Watson & Co.
ATTORNEYS.

UNITED STATES PATENT OFFICE.

FRANCESCO DEFRANCESCHINI, OF TORTONA, ITALY.

IMPROVEMENT IN INSECT-TRAPS.

Specification forming part of Letters Patent No. 147,226, dated February 3, 1874; application filed December 23, 1873.

*To all whom it may concern:*

Be it known that I, FRANCESCO DEFRANCESCHINI, of Tortona, Italy, have invented certain new and useful Improvements in Insect-Traps; and I do hereby declare that the following is a full, clear, and exact description thereof, that will enable others skilled in the art to which it appertains to make and use the same, reference being had to the accompanying drawings and to the letters of reference marked thereon, which form a part of this specification.

The nature of my invention consists in the construction and arrangement of an insect-trap for roaches or other insects, as will be hereinafter more fully set forth.

Figure 1:
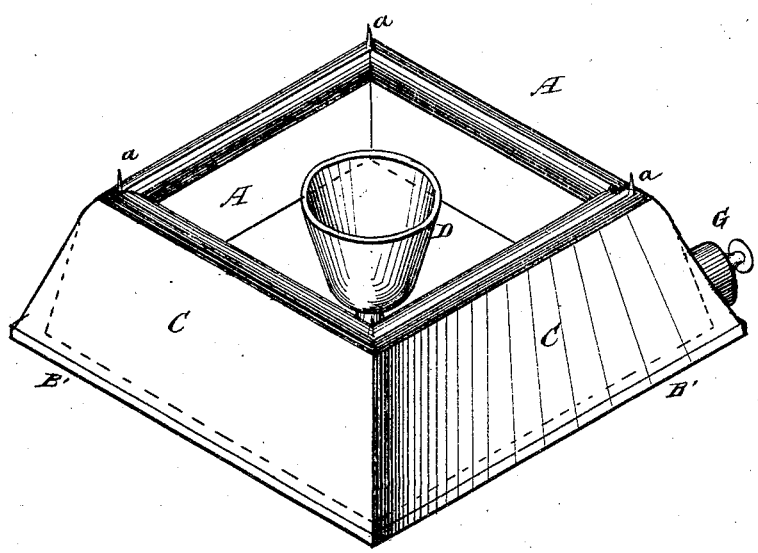
Figure 2:
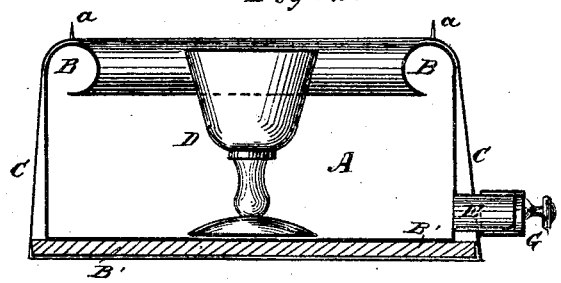

In the accompanying drawing, Figure 1 is a perspective view of my trap; and Fig. 2 is a vertical section of the same.

A represents a box, of square or other suitable form, made of tin, or any other material that will answer the purpose. The upper edges of the sides of the box are curved inward and downward, forming, as it were, inverted gutters B B, making a smooth convex surface on the upper side, and a sharp edge and a concave surface on the under side. This box is placed upon, and attached to, a wooden base, B', which extends beyond the sides of the box for a short distance. The sides of the box A are covered with muslin C, or other fibrous material, which extends from below the base B', and is fastened on top, at the corners of the box, by pins a, or in any other suitable manner, thus forming inclined flexible sides, upon which the roaches or other insects can easily walk to the top of the box, where they reach the convex surfaces B, and fall at once into the box. Once in the box, they cannot escape, on account of the perpendicular smooth walls; and, if they should be able to pass upward on the same, they will not be able to pass the concave under sides of the gutters B.

In the center of the box A is placed a goblet or cup, D, to hold wine or other bait, to draw the insects.

In the manufacture of this trap, I prefer to make the muslin covering C white, as that is more apt to attract the attention of the insects.

On one side of the box A is an outlet-tube, E, closed by a cap, G.

When insects have been collected in the box A, the bait-cup D is removed, and water poured into the box to drown the insects; after which the cap G is removed, and the water, with the dead insects, poured out through the tube E.

The muslin may be readily changed when worn or when it becomes soiled.

I am aware that traps have been made with a roughened outside surface; but this does not answer the same purpose as muslin, as the muslin furnishes a better foothold for the insect. And again, the roughened surface becomes glazed by use, and it is not convenient to restore it to its original state.

I am also aware that traps have been made with inclined sides and bait-cups; and I do not, therefore, broadly claim such device; but

Having thus fully described my invention, what I do claim, and desire to secure by Letters Patent, is—

The gutters B and enlarged base B', in combination with the muslin C, extending from the gutter to the base, leaving an open space between the muslin and the sides of the trap, and the muslin forming a rough flexible surface, as and for the purpose specified.

In testimony that I claim the foregoing I have hereunto set my hand this 20th day of December, 1873.

FRANCESCO DEFRANCESCHINI.

Witnesses:
 EZEKIEL MORETT,
 HARRY C. SCOTT.